United States Patent [19]

Helwig

[11] 4,246,317

[45] Jan. 20, 1981

[54] SILICATE COATED METAL TYING WIRE AND PROCESS FOR COATING SAID WIRE

[75] Inventor: Lawrence E. Helwig, Hampton Township, Allegheny County, Pa.

[73] Assignee: United States Steel Corporation, Pittsburgh, Pa.

[21] Appl. No.: 23,859

[22] Filed: Mar. 26, 1979

Related U.S. Application Data

[63] Continuation of Ser. No. 904,682, May 10, 1978, abandoned.

[51] Int. Cl.$^3$ .............................................. B05D 3/02
[52] U.S. Cl. .................. 428/375; 427/397.8; 428/341; 428/450
[58] Field of Search ................. 427/120, 372 B, 397.8; 428/375, 450, 341

[56] References Cited

U.S. PATENT DOCUMENTS 3,109,053  10/1963  Ahearn .................. 427/120 X

Primary Examiner—Bernard D. Pianalto
Attorney, Agent, or Firm—William F. Riesmeyer, III

[57] ABSTRACT

A metal tying wire product has an alkali or alkaline-earth, metal-silicate coating weighing at least 110 but not more than about 470 mg/ft$^2$ of wire surface, the coating being baked at temperatures in the range of 700°–1200° F. until essentially all physically adsorbed water is driven off so as to achieve a knot joint efficiency of at least 70%. A process for producing a tying wire product with such coatings is also disclosed.

14 Claims, 2 Drawing Figures

SILICATE COATED METAL TYING WIRE AND PROCESS FOR COATING SAID WIRE

This is a continuation, of application Ser. No. 904,682, filed May 10, 1978 now abandoned.

BACKGROUND OF THE INVENTION

In the field of industrial packaging, bundles of articles or loose materials are sometimes wrapped with metal tying wire applied by automatic machines which twist the wire into a knot to secure the bundle. The wire itself and the knot must meet certain strength requirements such as those specified by the American Association of Railroads (AAR) which require an ultimate tensile strength of at least 1275 pounds for 12 gage, 0.106 inch diameter Grade 145 wire and a knot joint strength when pulled in tension of 1080 pounds. To meet the AAR limits, a drawn round steel wire of AISI 1055 or 1065 composition may be supplied in the sub-critical annealed condition to provide wire ultimate tensile strength of at least 1275 pounds.

In prior art practice, the wire is coated with zinc applied by a hot dip process. The pure zinc outer layer is wiped off with asbestos wipes to leave an iron-zinc alloy coating which provides a good non-slip surface so that knots formed in the wire will meet the knot joint strength requirement. However, even with wiping, a relatively thick zinc layer is inherently formed in the hot-dip coating process. Consequently the wire has excellent corrosion resistance, better than is necessary for the application since moderate rusting may be tolerated after the wire is applied to the bundle. Thus, one disadvantage of the hot-dip galvanized product is that an excess of zinc is inherently used, increasing the cost of the product.

Another disadvantage lies in the fact that the wire must be cleaned prior to hot-dip galvanizing in order to remove drawing lubricant or other material which might prevent obtaining a uniform coating. Acid cleaning is normally used to clean the wire and causes additional expenses for disposal of used acids.

SUMMARY OF THE INVENTION

According to this invention, a metal tying wire product is provided, having a metal-silicate coating of at least 110 but not more than about 470 milligrams per square foot of wire surface, wherein the metal in said coating is selected from the group consisting of the alkali and alkaline-earth metals, and wherein said coating is baked at a temperature in the range of 700°–1200° F. unitl essentially all physically adsorbed water is driven off so as to achieve a knot joint efficiency of at least 70%. Also included in the invention is a process for providing such a coating on metal tying wire including, applying the coating in amounts such that the weight of coating remaining after baking will be at least 110 milligrams per square foot of wire surface, and then baking the coating at a temperature in the range of 700°–1200° F. for a time sufficient to drive off essentially all physically adsorbed water so as to achieve a knot joint efficiency of at least 70%.

It is preferred to apply coatings of alkali metal-silicates since the alkalinity of these solutions tends to clean the wire and eliminates the need for other forms of cleaning such as acid pickling prior to coating. Sodium silicate coatings are most preferred since these are readily available and least expensive.

Since the high baking temperatures used in the process coincide with normal sub-critical temperatures used for steel tying wire the anneal and baking may be performed simultaneously at a single temperature by extending the time at temperature beyond that normally used for baking alone.

Figure 1:
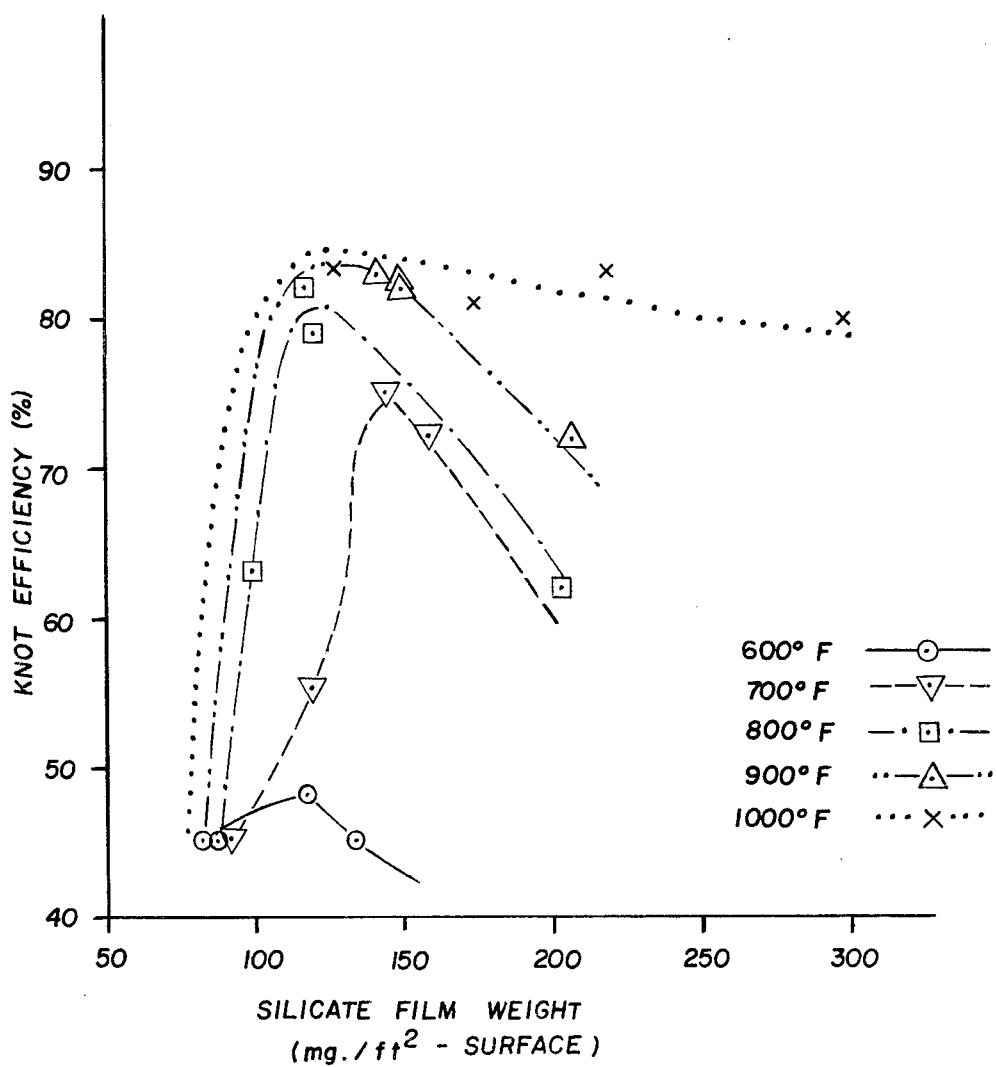
FIG. 1 is a graph of coating weight vs. knot joint efficiency for coatings baked at various temperature levels.
Figure 2:
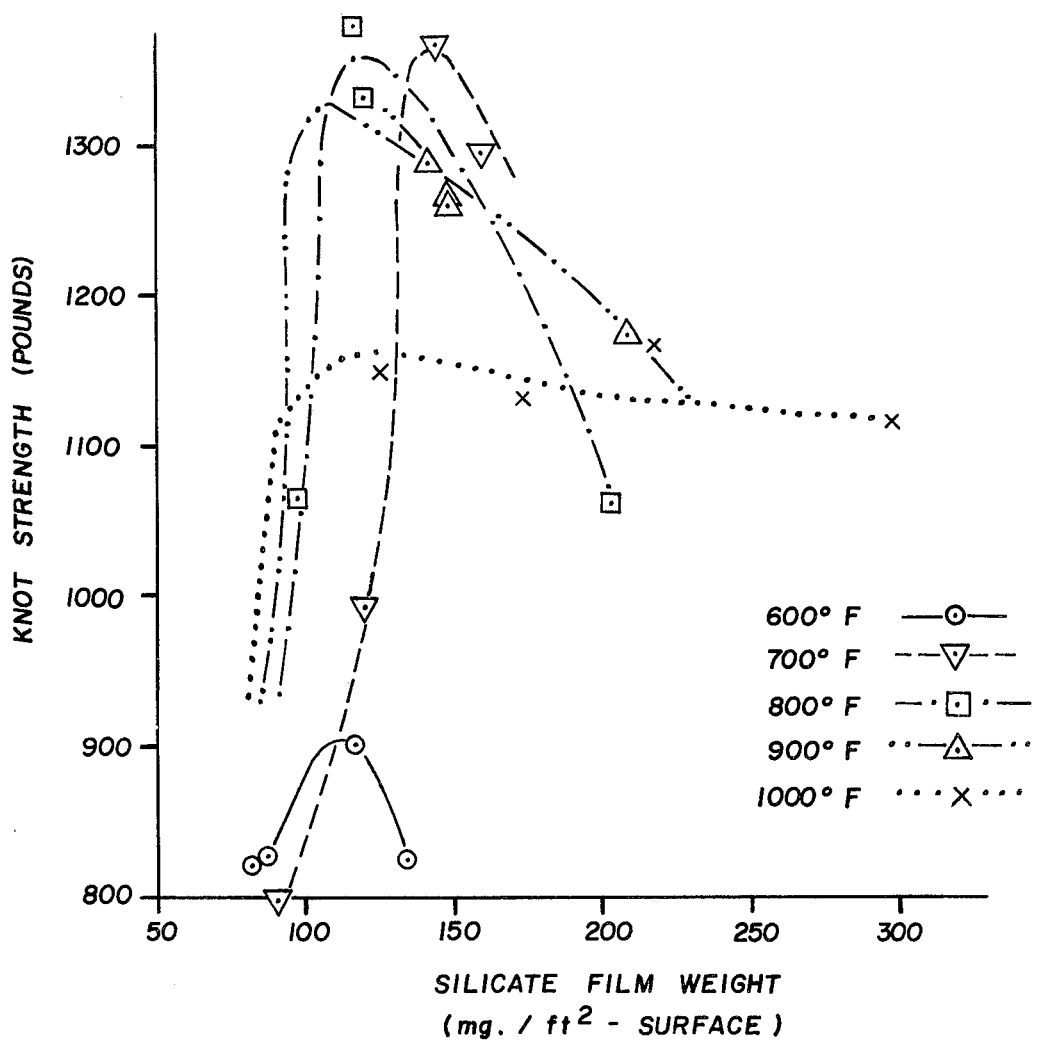

FIG. II is a graph of coating weight vs. knot strength in pounds for coatings baked at various temperature levels.

DETAILED DESCRIPTION OF THE INVENTION

A trial was made of coating 12 gage 0.106 inch diameter Grade 145 high tensile tying wire made from AISI 1055 or 1065 steel, with sodium silicate. The coating was applied by dipping whole coils of wire into a bath of sodium silicate solution. The weight of coating applied to each coil was controlled by the concentration of sodium silicate in the bath. Sodium silicate as purchased from Philadelphia Quartz Company was used to make baths of various concentration. Typically, Philadelphia Quartz Company's S 35 or N soluble sodium silicate may be used, or Diamond Shamrock's grades 40 or 34. As supplied, the silicate solution should have a density of 34° to 42° Baume (1.31 to 1.40 specific gravity), a $SiO_2$ to $Na_2O$ ratio of 3.2 to 3.8, and a solids content of 27 to 38 percent.

After application of the coating as described above, the coils were placed in a furnace and heated at a rate of 200° F./hr. to a temperature within the range of 600° to 1000° F. and then cooled with the furnace door open. Knots were made in sample portions of wire from each of the coils on a tying wire machine, such as the model produced by U.S. Steel Supply Division for such applications. The knots on such machines are made by overlapping the wire ends, holding the ends securely and then grasping the central part of the overlapped portions and twisting them several times until a twist of four or five full turns is made on each side of said central section. Knotted sample portions and unknotted portions of wire from each coil were then pulled to failure on a tensile test machine. The highest load attained for both the knotted and unknotted samples was recorded and used to calculate knot strength and knot joint efficiency where knot strength is defined as the ultimate strength or highest load in pounds and joint efficiency is the ratio of knot strength to ultimate strength or highest load of the unknotted wire, expressed in percent. The American Association of Railroads (AAR) specifies a minimum ultimate strength of 1275 pounds for 12 gage Grade 145 tying wire, and a joint strength of 1080 pounds.

The results of the various tests are shown below: Coating weights were adjusted for 30% uncoated areas in order to reflect the actual coating thickness in areas with coating. Coating weights are determined after all physically adsorbed water is driven off, i.e. after baking. Thus average coating weights on a particular length of wire sample was multiplied by 1.3 to correct for bare spots.

TABLE I

COILS COATED WITH SODIUM SILICATE

| Coating Weight mg/ft² of wire surface | Baking Temp. °F. | Knot Strength lbs | Knot Joint Efficiency Percent |
|---|---|---|---|
| 87 | 600 | 825 | 45 |
| 83 | 600 | 820 | 45 |
| 116 | 600 | 900 | 48 |
| 134 | 600 | 825 | 45 |
| 91 | 700 | 795 | 45 |
| 145 | 700 | 1365 | 75 |
| 160 | 700 | 1295 | 72 |
| 120 | 700 | 990 | 55 |
| 120 | 800 | 1330 | 79 |
| 116 | 800 | 1380 | 82 |
| 98 | 800 | 1065 | 63 |
| 203 | 800 | 1060 | 62 |
| 142 | 900 | 1290 | 83 |
| 149 | 900 | 1265 | 82 |
| 149 | 900 | 1265 | 82 |
| 207 | 900 | 1175 | 72 |
| 174 | 1000 | 1130 | 81 |
| 127 | 1000 | 1150 | 83 |
| 298 | 1000 | 1115 | 80 |
| 218 | 1000 | 1165 | 83 |

The results are also plotted FIGS. I and II. It will be noted in referring to FIG. I that in general knot joint efficiencies increase as the baking temperature increases, and also increase with coating weight up to an optimum value and then drop off with further increases of coating weight. A critical value of coating weight of about 110 milligrams per square foot of wire surface is necessary to achieve knot joint efficiencies of 70% or greater. The range of coating weight which is sufficient to provide a knot joint efficiency of 70% varies with the baking temperature. At a baking temperature of 1000° F. the dropoff with increasing coating weight is very slight. Coating weights up to 300 mg/ft² were tested, but it would be expected that substantially heavier coatings would suffice. The upper limit or coating weight for a baking temperature of 1000° F. would seem to be about 470 mg/ft² at which the coating tends to blister and flakes off in the guides tracks of automatic tying machines. When the coating is baked at 900° F. a range of coating weight from 110 to about 220 mg/ft² is sufficient to achieve 70% knot joint efficiency. When baked at 800° F., coating weights in the range of 110 to about 175 mg/ft² are sufficient for the 70% knot joint efficiency level, and when baked at 700° F., coating weights in the range of from 140 to about 170 mg/ft² are sufficient. None of the coatings baked at 600° F. were sufficient to provide a non-slip surface which prevents the knots from slipping when pulled in tension. This is indicated by the low levels of knot joint efficiency achieved by these coatings. Baking temperatures above 1000° F. could well be used. The upper limit would be expected at around 1200° F. where the silicates tend to fuse.

A similar relationship of knot strength is shown in FIG. II. The results indicate the actual level of knot strength achieved in pounds for the 12 gage Grade 145 steel tying wire. It will be apparent to those skilled in the art, however, that the invention is applicate to coating of tying wire made from any metal other than steel, and also tying wire of any shape cross section, other than round wire as used in these tests.

Similarly, it would be expected that coatings consisting of any of the alkali, alkaline-earth, metal-silicates (i.e. where the metal in the coating is selected from the class consisting of Group IA and IIA of the Periodic Table) would provide substantially enhanced knot joint efficiency when applied in the weight ranges and when baked at the temperatures indicated in Table I. It is preferred however, to use the alkali silicates since the alkalinity of these solutions tends to clean the wire and eliminate the need for other separate cleaning operations, e.g. acid pickling of of as drawn steel wire having lubricant, dirt or other foreign material on its surface. Of course, sodium silicate is most preferred since such solutions are the most readily available commercially and are the least expensive.

The coatings may be applied by various methods including processing single strands of wire through a continuous coating line, dipping whole coils in a bath of solution, spraying, using a roller, or electrostatic methods. Generally, the wire is at room temperature when being coated and the coating solution is maintained at temperatures between room temperature and 180° F.

The coating solution itself may be modified by various knwon means such as adding zinc powder in suspension for improving the corrosion resistance of the coating, or adding various metaloxide pigments to obtain colors as desired.

The coating may be baked by various means for applying heat externally, such as gas firing or electric heating, or by means for heating the wire itself, as by induction heating so that the cooling is dreid from the inner surface outward. The coatings should be baked at least until essentially all physically adsorbed water is driven off, i.e. until equilibrium is attained, but may be baked for longer periods as desired. In a preferred form, the baking of coatings applied to steel tying wire may be extended to achieve the desired physical properties of the wire e.g. elongation and strength of the desired levels achieved. By this means, the operation of the sub-critical anneal to which the steel wire is normally treated and baking of the coating may be carried out simultaneously in a single operation.

Without intending to be bound by theory, it is believed that the mechanism involved by which the coatings of this invention provide the proper non-slip surface and thus substantially enhanced knot joint efficiency, is that the coatings are brittle and have a crazed surface which tends to prevent slipping of the knot where it is pulled in tension. It is also essential, that the coating be insoluble in water and adherent to the wire surface. Coatings baked at the higher temperatures tend to have these properties and when present in sufficient amount, provide enough resistance to slippage so as to achieve knot joint efficiencies of 70% or greater.

I claim:

1. A slip resistant wire product having an adherent metal-silicate coating thereon, said coated product having been produced by applying to the wire an aqueous solution consisting essentially of a metal-silicate where the metal therein is selected from the group consisting of the alkali and alkaline earth metals, in amounts sufficient to provide a coating weighing at least 110 but not more than about 470 milligrams per square foot of wire surface after essentially all physically adsorbed water is driven off; and then baking said coating at a temperature in the range of 700° to 1200° F. until essentially all physically adsorbed water is driven off so as to achieve a knot joint efficiency of at least 70%.

2. The product of claim 1 wherein the metal in said coating is an alkali metal.

3. The product of claim 1 wherein the metal in said coating is sodium.

4. The product of claim 1 wherein the weight of the coating is within the range of 110 to 300 milligrams per square foot or wire surface.

5. The product of claim 1 wherein the weight of the coating is within the range of 110 to 200 milligrams per square foot of wire surface.

6. The product of claim 1 wherein the weight of the coating is within the range of 150 to 170 milligrams per square foot of wire surface.

7. The product of claim 5 wherein said coating is baked at a temperature in the range of 900° to 1100° F.

8. A process for coating wire which comprises: applying to said wire an aqueous solution consisting essentially of a metal-silicate where the metal therein is selected from the group consisting of the alkali and alkaline-earth metals, in amounts sufficient to provide a coating weight in the range of 110 to 470 milligrams per square foot of wire surface after all physically adsorbed water is driven off and then baking said coating at a temperature in the range of 700° to 1200° F., until essentially all physically adsorbed water is driven off so as to achieve a knot joint efficiency of at least 70%.

9. The process of claim 8 ehrein the metal in said coating is an alkali metal.

10. The process of claim 8 wherein the metal in said coating is sodium.

11. The process of claim 8 wherein the weight of said coating after all physically adsorbed water is driven off is within the range of 110 to 300 milligrams per square foot of wire surface.

12. The process of claim 8 wherein the weight of the coating after all physically adsorbed water is driven off is within the range of 110 to 220 milligrams per square foot of wire surface.

13. The process of claim 8 wherein the weight of the coating after all physically adsorbed water is driven off is within the range of 140 to 170 milligrams per square foot of wire surface.

14. The process of claim 12 wherein the coating is baked at a temperature in the range of 900° to 1100° F.

* * * * *